United States Patent [19]

Freeman et al.

[11] 4,283,470

[45] Aug. 11, 1981

[54] ANODE STRUCTURE FOR AN ELECTROCHEMICAL CELL

[75] Inventors: Roger K. Freeman, Plymouth; Franz Goebel, Sudbury, both of Mass.

[73] Assignee: GTE Products Corporation, Stamford, Conn.

[21] Appl. No.: 159,269

[22] Filed: Jun. 13, 1980

[51] Int. Cl.³ .............................................. H01M 4/02
[52] U.S. Cl. .................................. 429/209; 429/153; 429/239; 429/247; 428/596
[58] Field of Search ............... 429/209, 153, 239, 240, 429/247, 122, 241, 164, 165; 428/594, 596, 597, 544, 615, 616

[56] References Cited

U.S. PATENT DOCUMENTS

| | | | |
|---|---|---|---|
| 2,798,895 | 7/1957 | Zowotny | 429/153 X |
| 4,087,596 | 5/1978 | Sauer | 429/209 |

Primary Examiner—Charles F. LeFevour
Attorney, Agent, or Firm—Peter Xiarhos

[57] ABSTRACT

An anode structure for a cylindrical primary electrochemical cell. The anode structure in accordance with the invention includes a thin, circular, lithium metal disc having a central opening therein, and a small, thin, resilient, metal (e.g., nickel) contact member secured to the lithium disc. The metal contact member is of a generally circular configuration and has a flat central portion with a circular opening therein aligned with the opening in the lithium disc. The contact member has a plurality of tab portions extending outwardly from, and spaced at regular intervals about, its outer periphery, and a pair of spikes or barbs depending from opposed ends of each tab portion. The spikes are pressed into the soft lithium disc at points spaced from the opening therein for permanently securing the contact member to the disc. The contact member further has a plurality of notches spaced at regular intervals about the perimeter of the central opening thereby to define a plurality of resilient, deflective portions intermediate to the notches. The deflective portions lie in a flat, common plane with each of the deflective portions having an exposed edge facing a central axis of the contact member.

18 Claims, 6 Drawing Figures

ANODE STRUCTURE FOR AN ELECTROCHEMICAL CELL

CROSS-REFERENCE TO RELATED APPLICATIONS

In co-pending application Ser. No. 159,271, filed concurrently herewith in the names of Franz Goebel and William T. McHugh, and entitled "ELECTROCHEMICAL CELL", there is disclosed and claimed an electrochemical cell similar to an electrochemical cell as disclosed in the present application.

In co-pending application Ser. No. 159,266, filed concurrently herewith in the names of John E. Barnes, Franz Goebel and William T. McHugh, and entitled "INTEGRATED CARBON/INSULATOR STRUCTURE AND METHOD FOR FABRICATING SAME", there is disclosed and claimed an integrated carbon/insulator structure as may be used in the electrochemical cell as disclosed in the present application.

In co-pending application Ser. No. 159,268, filed concurrently herewith in the name of Franz Goebel, and entitled "METHOD FOR ASSEMBLING AN ELECTROCHEMICAL CELL", there is disclosed and claimed a method for assembling the electrochemical cell as disclosed in the present application.

BACKGROUND OF THE INVENTION

The present invention relates to an anode structure for an electrochemical cell and, more particularly, to an anode structure for a primary electrochemical cell of a cylindrical design and including a stacked array of cell components.

Primary electrochemical cells are utilized for a wide variety of applications and are commonly available in a large assortment of sizes and shapes. One well known type of primary electrochemical cell is a so-called cylindrical cell. A particularly suitable design for such a cell, especially for high rate (greater than 1 mA/cm$^2$) and low-temperature (to $-40°$ C.) applications, is described in the aforementioned co-pending application Ser. No. 159,271. The cell described in the co-pending application includes a battery stack disposed within a metal housing of the cell together with an electrolytic solution. The battery stack comprises a large number of thin, generally circular, annular-shaped components. These components are superimposed on each other in a vertical stacked array relative to the housing and relative to a central, elongated, cylindrical, metal terminal member which extends completely through the battery stack and is encircled by the battery stack components.

The components of the battery stack include a plurality of anode structures and a plurality of carbon current collector electrode/separator assemblies arranged in the array in alternation with the anode structures. The elongated metal terminal member may be a solid rod or, in the case of a cell of large physical size, a perforated hollow tube for increasing exposure of the stack to electrolytic solution. Each of the anode structures includes a thin metal disc, for example, of lithium, and a contact member adjacent to a central opening in the disc. The contact member has a central opening aligned with the opening in the disc and a plurality of resilient portions defined by said central opening by which the anode structure can be forced onto the end of, and along, the central terminal member to its required position in the stack. When in position, the resilient portions of the contact member grip onto the central terminal member to make direct physical and electrical contact therewith. Each of the carbon current collector electrode/separator assemblies as employed in the above-described cell includes a pair of thin carbon/fiberglass cathode structures physically adjacent to opposite sides of a thin metal (e.g., nickel) current collector disc. These latter components have central openings of a size to space, or electrically isolate, the components from the central terminal member. The current collector disc is of a size and configuration so as to make direct physical and electrical contact with the interior wall of the housing of the cell.

The electrochemical cell as described hereinabove may be assembled by first assembling the entire battery stack relative to the central terminal member outside of the housing and then placing the entire battery stack into the housing or, alternatively, by assembling the components of the battery stack one by one relative to the central terminal member within the housing of the cell. While either assembly method produces generally satisfactory results, it is possible as the battery stack is built up for one or more of the cell components, especially the anode structures which are secured to the central terminal member at the centers thereof, to flare up at the outer edges. This flaring up of the outer edges of the anode structures is due to the fact that the anode structures themselves are very thin and lightweight, as are the other components on opposite sides of the anode structures, as a result of which insufficient compressive forces exist at the outer edges of the anode structures to keep them in a flat position. This flaring up of the outer edges of the anode structures tends to increase in a direction from the bottom of the stack to the top of the stack. As a result, the overall battery stack may be less flat and compact than required, and undesirable gaps or spaces may exist between various ones of the components, leading to the possibility of breakage of one or more of these components.

BRIEF SUMMARY OF THE INVENTION

In accordance with the present invention, an anode structure of improved design is provided for use in an electrochemical cell. The anode structure in accordance with the invention includes a metal disc of a predetermined thickness and having an opening therein, and a resilient, metal contact member secured to the metal disc. The resilient metal contact member is of a predetermined thickness and configuration and has a plurality of spikes depending therefrom at its periphery. The spikes are inserted into the metal disc at points spaced from the opening in the metal disc for securing the contact member to the metal disc. The contact member further has a major opening therein adjacent to the opening in the metal disc and a plurality of other openings at the perimeter of the major opening defining a plurality of resilient, deflective portions intermediate to said other openings. Each of the deflective portions further has an exposed edge. The edges of the deflective portions are employed during an assembly operation for securing the anode structure to a contact terminal of an electrochemical cell.

BRIEF DESCRIPTION OF THE DRAWING

Various objects, features and advantages of an anode structure in accordance with the present invention for use in a primary electrochemical cell will be apparent from a detailed discussion taken in conjunction with the accompanying drawing in which.

DETAILED DESCRIPTION OF THE INVENTION

Figure 1:
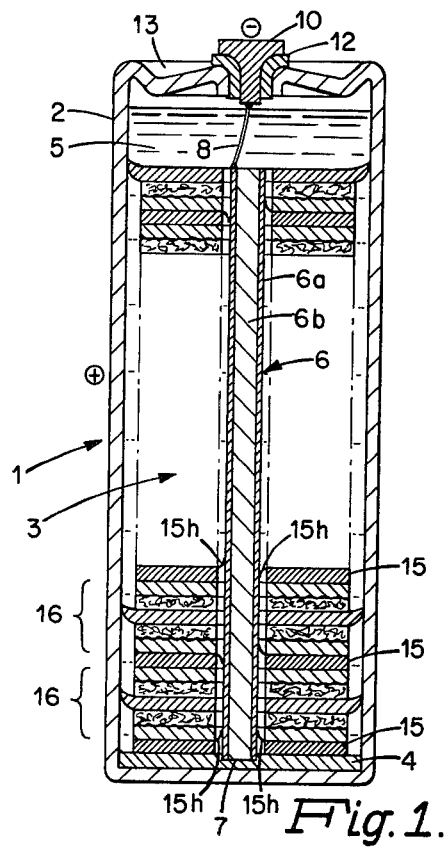
FIG. 1 is an elevated view, partly in cross section, of a primary electrochemical cell employing a plurality of anode structures in accordance with the present invention.

Referring now to FIG. 1, there is shown a primary electrochemical cell 1 employing a plurality of anode structures 15 in accordance with the present invention. The electrochemical cell 1 as shown in FIG. 1 generally includes an elongated cylindrical metal case or housing 2, for example, of stainless steel, within which a battery stack 3 is disposed and insulated from the metal housing 2 by means of a suitable insulator 4 at a bottom end of the housing. The housing 2 of the cell 1 further includes an electrolytic solution 5 in contact with the battery stack 3. This solution may include a reducible soluble cathode such as thionyl chloride and an electrolyte solute such as lithium tetrachloroaluminate dissolved in the thionyl chloride.

The battery stack 3 as employed within the cell 1 comprises a large number of thin, generally circular, annular-shaped components which are superimposed directly on each other in a vertical stacked array relative to the housing 2 and relative to a terminal assembly 6 which extends completely and centrally through the battery stack 3 and is encircled by the aforesaid components. The terminal assembly 6, which will be described in greater detail hereinafter, comprises a slotted elongated metal tube 6a, shown more clearly in FIG. 6, and a solid metal rod 6b, of the same length as, and disposed within, the tube 6a. The tube 6a and the rod 6b, which may be of nickel, are restrained at the bottom ends thereof within a detent 7 in the insulator 4. The tube 6a is connected at its top end by a thin metal strip 8 to a metal terminal 10 of the cell 1. The metal strip 8, which may be of nickel, is typically connected to the tube 6a of the assembly 6 and to the terminal 10 by spot welds and is connected to the terminal 10 by way of a standard insulative glass or ceramic-to-metal seal 12 provided within an hermetically sealed cap 13 of the cell 1. As will be more readily apparent hereinafter, the terminal assembly 6, the metal strip 8 and the terminal 10 collectively represent one of the electrical terminals for the cell 1.

The various stacked components of the battery stack 3 as mentioned hereinabove generally include a plurality of anode structures 15 in accordance with the invention, and a plurality of carbon current collector electrode/separator assemblies 16 arranged in the array in alternation with the anode structures 15. Each of the anode structures 15 has a particular form as shown in FIGS. 2 and 3, and each of the carbon current collector electrode/separator assemblies 16 has a particular form as shown in FIGS. 4 and 5.

Figure 2:
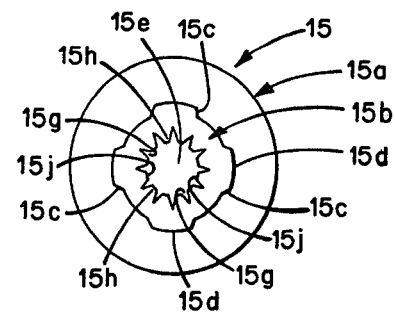
FIGS. 2 and 3 are greatly enlarged top and cross-sectional views, respectively, of an anode structure as utilized by the electrochemical cell of FIG. 1.
Figure 3:
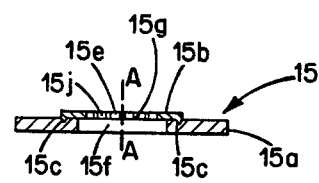

As indicated in FIGS. 2 and 3, each of the anode structures 15 in accordance with the invention comprises a thin, flat, generally circular, annular-shaped disc 15a, and a small, generally circular contact member 15b secured to the disc 15a. A suitable material for the disc 15a for use within the cell 1 is an oxidizable alkali metal, such as lithium, and a suitable thickness is 0.005–0.006 inch. The contact member 15b, which may be of nickel of a thickness of 0.003–0.005 inch, is secured to the lithium anode disc 15a by means of several small, downwardly-directed spikes or barbs 15c which are arranged in pairs and depend from opposite ends of a plurality of tab portions 15d. The tab portions 15d extend outwardly and are spaced around the periphery of the contact member 15b at 90° intervals, and the barbs 15c themselves are spaced around the periphery of the contact member 15b at 45° intervals. The barbs 15c, which typically extend orthogonally from the contact member 15b, are pressed into the lithium disc 15a, as indicated in FIG. 3, and bite into the soft lithium metal for permanent physical and electrical contact therewith. The contact member 15b further has a circular major opening 15e in a flat central portion thereof aligned with a similar, larger opening 15f (FIG. 3) in the disc 15a, and a plurality of small openings 15g in the form of triangular-shaped notches equally spaced about the perimeter of the central opening 15e, for example, at 30° intervals. The notches 15g define a plurality of resilient, deflective portions 15h, or "teeth", intermediate to the notches 15g and lying within a flat, common plane orthogonal to a central axis A—A (FIG. 3) of the contact member 15b. Each of the portions 15h further has a sharp contact edge 15j of slight curvature and facing the center of the contact member 15b. The portions 15h of the contact member 15b establish direct physical contact with the terminal assembly 6 and, due to the sharp edges 15j of the portions 15h, bite into the tube 6a of the assembly 6 in numerous places, as indicated in FIG. 1, so as to secure the anode structure 15 in position. The manner in which this contact is established will be described in greater detail hereinafter in connection with FIG. 6. As indicated in FIG. 1, the diameter of each anode structure 15 is selected to be smaller than the internal diameter of the housing 2 of the cell 1 so as to establish a space between the anode structure 15 and the interior wall of the housing 2 by which the stack 3 can be exposed to the electrolytic solution 5. A suitable diameter for the anode structure 15 is 0.850 inch, corresponding to a C-size cell. A typical internal diameter for the housing 2 is 0.960 inch. A suitable diameter for the contact member 15b (largest diametric dimension) is 0.250 inch, and a suitable diameter for the opening is 0.128 inch.

Figure 4:
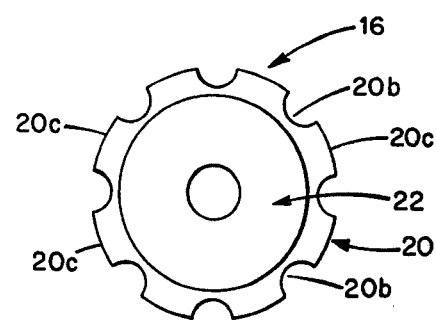
FIGS. 4 and 5 are greatly enlarged top and cross-sectional views, respectively, of a carbon current collector electrode/separator assembly utilized by the electrochemical cell of FIG. 1.
Figure 5:
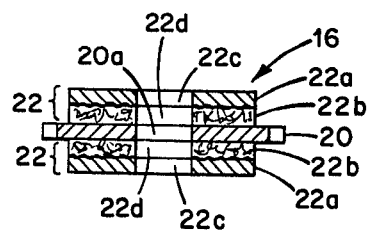

Each of the aforementioned carbon current collector electrode/separator assemblies 16 as shown in FIGS. 4 and 5 generally includes a thin, circular, notched metal current collector substrate 20, and a pair of integrated carbon/insulator structures 22 on opposite sides of the current collector substrate 20. The integrated carbon insulator structures 22 as shown in FIGS. 1 and 5, although forming part of the electrode/separator assembly within the cell 1, both physically and actively, are not secured to the current collector substrate 20 but rather are only in direct physical contact with the substrate 20 when assembled into the cell 1. The current collector substrate 20 as employed by the cell 1 and shown in FIGS. 4 and 5 takes the form of a generally thin, circular, flat disc of a metal such as nickel having a circular central opening 20a (FIG. 5) and a plurality of openings 20b in the form of curved notches spaced around its periphery at regular intervals and defining small arcuate peripheral portions 20c intermediate to the notches. The opening 20a in the substrate 20 is of a diameter greater than the diameter of the terminal assembly 6 so as to establish a spacing, and to be electrically isolated from, the terminal assembly 6 when the substrate 20 and the associated carbon/insulator structures 22 are assembled together into the cell 1. The notches 20b serve to establish multiple passageways by which the electrolytic solution 5 is able quickly and readily to permeate porous components of the battery stack 3. In addition, and as will be more fully explained hereinafter, the notches 20b enable the peripheral portions 20c to be deflected upwardly during assembly of the cell 1 whereby sharp edges of the portions 20c are able to bite into the interior wall of the housing 2 and, as indicated in FIG. 1, make direct physical and electrical contact with the wall of the housing 2 in numerous places. The diameter of the substrate 20 prior to insertion into the housing 2 is slightly greater than the internal diameter of the housing 2 so as to permit upward deflection of the arcuate portions 20c when the substrate 20 is inserted into the housing 2.

Each of the carbon/insulator structures 22 used with the abovedescribed current collector substrate 20 comprises, as shown in FIG. 5, an arrangement of a thin porous insulator sheet or disc 22a physically and permanently integrated with a porous carbon layer or disc 22b. The porous insulator disc 22a is of an electrically-nonconducting material such as fiberglass and serves as a separator for electrically isolating the associated porous carbon disc 22b from an immediately adjacent one of the lithium anode structures 15. The porous carbon disc or layer 22b comprises an aggregation of porous globules or conglomerates containing carbon black and a binder such as "Teflon" and having a network of electrolyte-conducting channels formed throughout its entire mass for permitting the electrolytic solution 5 to permeate the layer 22b and the associated insulator disc 22a. For purposes of assembly within the cell 1, the porous insulator disc 22a and the porous carbon layer 22b have respective circular central openings 22c and 22d of the same size as, and aligned with, the opening 20a in the current collector substrate 20a for providing a space between these elements and the assembly 6 when assembled within the cell 1.

The carbon/insulator structures 22 as described hereinabove are described in detail in the aforementioned co-pending application Ser. No. 159,266 to which reference may be made for specific details. The current collector substrate 20 as described hereinabove is described in detail in the aforementioned co-pending application Ser. No. 159,271 to which reference may be made for specific details. Suitable thicknesses for the porous insulator disc 22a and the porous carbon layer 22b are 0.005 and 0.007 inch, respectively. A suitable thickness for the current collector substrate 20 is 0.003 inch.

Figure 6:
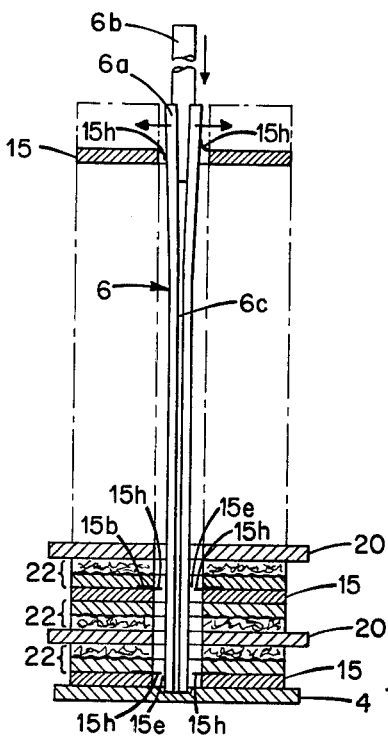
FIG. 6 illustrates a step employed in the assembly of the anode structures and other cell components into the electrochemical cell of FIG. 1.

The electrochemical cell 1 as described hereinabove is assembled in the following manner. First, the anode structures 15, the current collector substrates 20 and the carbon/insulator structures 22 are dropped down in proper sequence over the tube 6a of the terminal assembly 6 so as to generally loosely encircle the tube 6a. As indicated in FIG. 6, the openings 15e in the contact members 15b of the anode structures 15 are slightly larger than the diameter of the tube 6a so as to establish a small space therebetween but not as large as the spaces established between the other components of the battery stack 3 and the tube 6a, which other components have openings of considerably larger size than the openings 15e in the contact members 15b of the anode structures 15. As also indicated in FIG. 6, the above assembly operation is performed externally of the housing 2 of the cell 1.

Once the abovedescribed cell components have been assembled around the tube 6a, the anode structures 15 in the stack are caused to be secured to the tube 6a. To accomplish this operation, the tube 6a as employed at this point is selected to be a permanently expandable member which makes physical contact with the anode structures 15, specifically, the contact members 15b thereof, when in its expanded state but not when in its non-expanded state. To expand the tube 6a, the aforementioned elongated metal rod 6b is inserted into and pushed longitudinally down through the tube 6a, as indicated in FIG. 6. The rod 6b initially has a diameter greater than the inside diameter of the tube 6a, for example, a diameter of 0.062 inch as compared with an initial inside diameter of 0.052 inch for the tube 6a. A suitable initial outside diameter for the tube 6a is 0.126 inch (representing a wall thickness for the tube 6a of 0.032 inch). When the rod 6b is pushed down the tube 6a, the tube 6a, which has a generally C-shaped cross section by virtue of the provision of a slot 6c therein, is caused to expand outwardly in a permanent fashion. The rod 6b is left permanently within the tube 6a, as indicated in FIG. 1, so as to insure that the tube 6a remains in its expanded state. As the tube 6a expands outwardly, the forces of the outward expansion are distributed more or less evenly to the resilient deflective portions 15h of each of the multiple contact members 15b, in succession, as the rod 6b is progressively advanced past successive ones of the anode structures 15 along the length of the tube 6a. The forces against the contact edges 15j of the portions 15h, which lie in a flat, common plane as previously mentioned, cause the portions 15h variously to be deflected upwardly and/or downwardly in a random fashion relative to the tube 6a. The edges 15j of the portions 15h following the deflection of the portions 15h (at the termination of the expansion operation) bite into the tube 6a in numerous places, as indicated in FIG. 1, thereby locking the anode structures in position. The outward expansion of the tube 6a does not affect the other cell components since, as previously mentioned, the central openings in these components are considerably larger than the openings 15e in the contact members 15b of the anode structures 15. A suitable slot width (non-expanded) for the tube 6a as described hereinabove is 0.010 inch.

The above expansion operation by which the anode structures 15 are secured to the tube 6a results in a stacked array of components which is very compact and devoid of unwanted spaces or gaps between the components constituting the stack due to flared or upturned edges. The possibility of breakage of the components is therefore substantially reduced. For physically large cells, the rod 6b as described hereinabove may be replaced by a hollow tube (without a slot) and, in addition, both of the tubes may be perforated for facilitating the exposure of the battery stack to the electrolytic solution when assembled into the housing 2 of the cell.

Once the anode structures 15 have been secured to the terminal assembly 6 as described hereinabove, various standard resistance measurement tests may be made on the stack of components to detect any unwanted short circuit conditions, for example, short circuit conditions between the carbon current collector electrode/separator assemblies 16 and the terminal assembly 6 and/or the anode structures 15. Assuming that no such short circuit conditions exist, the assembly of the battery stack components and the terminal assembly 6 can then be inserted into the housing 2 of the cell 1 and electrolytic solution added to the cell. The insertion operation is performed by simply pushing the entire assembly of cell components and the terminal assembly 6 longitudinally into and along the housing 2. As the assembly is pushed into the housing 2, the arcuate portions 20c of the substrates 20 are caused to turn, or be deflected, upwardly slightly by virtue of physical contact with the interior wall of the housing 2. At the same time, the arcuate portions 20d are caused to move slightly toward each other as the individual substrates 20 conform to the internal diameter and configuration of the housing 2. When the multiple substrates 20 have all been inserted into the housing 2, the upturned, deflected arcuate portions 20c, by virtue of their sharp edges, bite into the interior wall of the housing 2 in numerous places, as indicated in FIG. 1, so as to secure the substrates 20 in position and make physical and electrical contact with the housing 2.

When the abovedescribed battery stack assembly has been positioned within the cell 1 and exposed to electrolytic solution as discussed hereinabove, the electrolytic solution (e.g., cathodelectrolyte solution) is readily able to diffuse into the stack and permeate the porous components thereof. The flow of the electrolytic solution to the components of the stack is facilitated by the aforedescribed numerous notches 20b formed in the current collector substrates 20 and adjacent to the interior wall of the housing and by the spaces established between the components of the stack and the interior wall of the housing 2 and the terminal assembly 6. As previously mentioned, the flow of electrolytic solution to the battery stack 3 can be further increased, especially in the case of a physically large cell, by the use of hollow, elongated tubes in lieu of the non-perforated tube 6a and the solid rod 6b, in which case the electrolytic solution is able to further penetrate the battery stack 3 by way of the perforations in the tubes. Irrespective of the particular manner in which the electrolytic solution reaches the battery stack, the electrolytic solution diffuses into the multiple carbon discs 22b by way of the network of electrolyte-conducting channels formed therein and also diffuses into the multiple porous discs 22a. The physical and electrical connection of the multiple anode structures 15 to the terminal assembly 6 establishes that assembly and the metal strip 8 and the terminal 10 connected therewith as the negative terminal of the cell 1. The physical and electrical connection of the multiple substrates 20 to the interior wall of the housing 2 establishes the housing 2 as the positive terminal of the cell 1.

While there has been described what is considered to be a preferred embodiment of the invention, it will be apparent to those skilled in the art that various changes and modifications may be made therein without departing from the invention as called for in the appended claims.

What is claimed is:

1. A contact member comprising:
a resilient metal member of a predetermined thickness and configuration and having a plurality of spikes depending therefrom at its periphery and further having a major opening therein and a plurality of other openings at the perimeter of the major opening defining a plurality of resilient, deflective portions intermediate to said other openings and each having an exposed edge.

2. A contact member in accordance with claim 1 wherein:
the resilient, deflective portions of the metal member lie in a flat, common plane.

3. A contact member in accordance with claim 1 wherein:
the major opening in the metal member is circular and located centrally in the metal member; and
the plurality of other openings are of like size and shape and spaced at regular intervals about the perimeter of the major opening thereby to define resilient, deflective portions of like size and shape intermediate to said plurality of other openings.

4. A contact member in accordance with claim 3 wherein:
the plurality of other openings are spaced around the perimeter of the major opening at regular intervals of 30°.

5. A contact member in accordance with claim 4 wherein:
the plurality of other openings are in the form of triangular-shaped notches.

6. A contact member in accordance with claim 1 wherein:
the metal member has a plurality of tab portions extending outwardly from and spaced about its periphery; and
the plurality of spikes includes a pair of spikes at opposite ends of and extending away from each of the tab portions.

7. A contact member in accordance with claim 6 wherein:
the tab portions are spaced about the periphery of the metal member at regular intervals.

8. A contact member in accordance with claim 7 wherein:
the tab portions are spaced about the periphery of the metal member at intervals of 90° and the spikes occur at intervals of 45°.

9. A contact member comprising:
a generally circular, resilient, metal member of a predetermined thickness and configuration and having a plurality of tab portions spaced at regular intervals about its periphery and a pair of spikes at opposite ends of, and depending from, each tab portion, said metal member further having a flat central portion and a circular major opening located centrally within said flat portion and a plurality of notches of like size and shape spaced at regular intervals about the perimeter of the major opening thereby to define a plurality of resilient, deflective portions of like size and shape intermediate to said notches and lying within a flat, common plane.

10. A contact member in accordance with claim 9 wherein:
the metal member is of nickel having a thickness in range of 0.003–0.005 inch;
the tab portions are spaced about the periphery of the metal member at regular intervals of 90°;
the spikes occur at intervals of 45°; and
the notches are spaced about the perimeter of the major opening at regular intervals of 30°.

11. An anode structure for an electrochemical cell, comprising:
   a metal disc of a predetermined thickness and having an opening therein; and
   a resilient, metal contact member of a predetermined thickness and configuration and having a plurality of spikes depending therefrom at its periphery and inserted into the metal disc at points spaced from the opening in the metal disc for securing the contact member to the metal disc, said metal contact member further having a major opening therein adjacent to the opening in the metal disc and a plurality of other openings at the perimeter of the major opening defining a plurality of resilient, deflective portions intermediate to said other openings.

12. An anode structure in accordance with claim 11 wherein:
   the metal disc is of an oxidizable alkali metal.

13. An anode structure in accordance with claim 12 wherein:
   the metal disc is of lithium.

14. An anode structures in accordance with claim 13 wherein:
   the metal contact member has a flat central portion and the major opening and the other openings are located in said flat portion whereby the resilient deflective portions of the contact member lie in a flat, common plane.

15. An anode structure in accordance with claim 14 wherein:
   the opening in the lithium metal disc is circular; and
   the major opening in the contact member is circular and smaller than, and coaxial with, the opening in the lithium metal disc; and
   the plurality of other openings at the perimeter of the major opening are of like size and shape and spaced at regular intervals about the perimeter of the major opening in the contact member thereby to define resilient, deflective portions of the same size and shape intermediate to the plurality of other openings and each having a curved exposed edge.

16. An anode structure in accordance with claim 15 wherein:
   the contact member has a plurality of tab portions extending outwardly from and spaced about its periphery; and
   the plurality of spikes include a pair of spikes at opposite ends of and extending away from each of the tab portions.

17. An anode structure in accordance with claim 16 wherein:
   the plurality of other openings at the perimeter of the major opening are in the form of notches and spaced about the perimeter of the major opening at regular intervals of 30°;
   the tab portions are spaced about the periphery of the contact member at regular intervals of 90°; and
   the spikes occur at regular intervals of 45°.

18. An anode structure in accordance with claim 17 wherein:
   the lithium disc is generally circular in configuration, and has a thickness in a range of 0.005–0.006 inch; and
   the contact member is of nickel and has a thickness in a range of 0.003–0.005 inch.

* * * * *